US011604831B2

(12) United States Patent
Tsunomori

(10) Patent No.: US 11,604,831 B2
(45) Date of Patent: Mar. 14, 2023

(54) INTERACTIVE DEVICE

(71) Applicant: NTT DOCOMO, INC., Chiyoda-ku (JP)

(72) Inventor: Yuiko Tsunomori, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 109 days.

(21) Appl. No.: 17/044,099

(22) PCT Filed: Apr. 25, 2019

(86) PCT No.: PCT/JP2019/017734
§ 371 (c)(1),
(2) Date: Sep. 30, 2020

(87) PCT Pub. No.: WO2019/235100
PCT Pub. Date: Dec. 12, 2019

(65) Prior Publication Data
US 2021/0103619 A1 Apr. 8, 2021

(30) Foreign Application Priority Data
Jun. 8, 2018 (JP) .............................. JP2018-110386

(51) Int. Cl.
*G06F 16/9032* (2019.01)
*G06F 16/909* (2019.01)
(Continued)

(52) U.S. Cl.
CPC ...... *G06F 16/90332* (2019.01); *G06F 16/909* (2019.01); *G06F 16/9035* (2019.01); *G10L 15/07* (2013.01); *G10L 15/22* (2013.01)

(58) Field of Classification Search
CPC ........... G06F 16/90332; G06F 16/9035; G06F 16/909; G06F 3/167; G10L 15/07; G10L 15/22; G10L 13/00
(Continued)

(56) References Cited

U.S. PATENT DOCUMENTS 11,210,718 B1 * 12/2021 Engelbart .......... G06Q 30/0641
11,212,584 B2 * 12/2021 Docherty ................ H04L 67/34
(Continued)

FOREIGN PATENT DOCUMENTS

JP    2001-188787 A    7/2001
JP    2006-292980 A    10/2006

OTHER PUBLICATIONS

International Preliminary Report on Patentability dated Dec. 17, 2020 in PCT/JP2019/017734 (submitting English translation only) 7 pages.
(Continued)

Primary Examiner — Thuykhanh Le
(74) Attorney, Agent, or Firm — Oblon, McClelland, Maier & Neustadt, L.L.P.

(57) ABSTRACT

A dialogue device enabling speech capable of improving a degree of intimacy with a user or a user satisfaction is provided. An input information acquiring unit (101) configured to acquire input information from a user, a focus information acquiring unit (103) configured to acquire focus information representing a focus in the input information, a user profile DB (110) configured to store profile information of the user and date and time information at which the profile information is registered in association with each other, a profile information acquiring unit (107) configured to acquire the profile information in accordance with a priority level determined on the basis of the date and time information from a user profile corresponding to the focus informa-
(Continued)

tion stored in the user profile DB (110), and a speech generating unit (108) configured to generate a speech sentence (speech information) corresponding to the user profile are included.

10 Claims, 9 Drawing Sheets

(51) Int. Cl.
    *G06F 16/9035*      (2019.01)
    *G10L 15/07*      (2013.01)
    *G10L 15/22*      (2006.01)

(58) Field of Classification Search
    USPC .......................................................... 704/9
    See application file for complete search history.

(56) References Cited

U.S. PATENT DOCUMENTS

| | | | | |
|---|---|---|---|---|
| 2007/0038436 | A1* | 2/2007 | Cristo | G10L 15/22 704/E15.04 |
| 2012/0265528 | A1* | 10/2012 | Gruber | G10L 15/18 704/235 |
| 2013/0073585 | A1* | 3/2013 | Kinugawa | G06F 16/2425 707/769 |
| 2014/0149931 | A1* | 5/2014 | Miki | G06F 9/451 715/803 |
| 2014/0171133 | A1* | 6/2014 | Stuttle | H04L 51/04 455/466 |
| 2014/0172953 | A1* | 6/2014 | Blanksteen | H04W 4/33 709/203 |
| 2015/0002483 | A1* | 1/2015 | Case | G06F 3/04883 345/179 |
| 2015/0264129 | A1* | 9/2015 | Takeuchi | H04N 1/00352 709/205 |
| 2016/0098393 | A1* | 4/2016 | Hebert | G06F 16/3344 704/9 |
| 2016/0163332 | A1* | 6/2016 | Un | G06F 40/30 704/260 |
| 2017/0075924 | A1* | 3/2017 | Rogers | H04W 4/18 |
| 2017/0140041 | A1* | 5/2017 | Dotan-Cohen | G06Q 10/101 |
| 2017/0193349 | A1* | 7/2017 | Jothilingam | G06N 20/20 |
| 2017/0228240 | A1* | 8/2017 | Khan | G06F 16/438 |
| 2017/0289093 | A1* | 10/2017 | Snider | H04L 51/234 |
| 2018/0083908 | A1* | 3/2018 | Dotan-Cohen | G06Q 10/107 |
| 2018/0191596 | A1* | 7/2018 | Bhaya | G10L 15/26 |
| 2018/0286423 | A1* | 10/2018 | Nakadai | G10L 21/028 |
| 2018/0357309 | A1* | 12/2018 | Eidem | H04L 67/141 |
| 2018/0357998 | A1* | 12/2018 | Georges | G10L 15/14 |
| 2019/0027147 | A1* | 1/2019 | Diamant | G06V 20/63 |
| 2019/0132306 | A1* | 5/2019 | Avni | G06Q 50/01 |
| 2019/0138579 | A1* | 5/2019 | Ali | G06F 16/4393 |
| 2019/0155934 | A1* | 5/2019 | Delaney | G06F 16/24575 |
| 2019/0156222 | A1* | 5/2019 | Emma | G06N 5/041 |
| 2019/0205468 | A1* | 7/2019 | Barnes, Jr. | G10L 15/26 |
| 2019/0306105 | A1* | 10/2019 | Snibbe | G10L 25/63 |
| 2019/0318724 | A1* | 10/2019 | Chao | G10L 15/22 |
| 2019/0318729 | A1* | 10/2019 | Chao | G10L 15/14 |
| 2020/0090645 | A1* | 3/2020 | Satoh | G06F 40/253 |
| 2020/0152197 | A1* | 5/2020 | Penilla | H04L 67/12 |
| 2020/0372910 | A1* | 11/2020 | Okuda | G06Q 10/10 |
| 2020/0379787 | A1* | 12/2020 | Martin | G06F 16/176 |
| 2021/0043208 | A1* | 2/2021 | Luan | G10L 25/63 |
| 2021/0049085 | A1* | 2/2021 | Zhang | G06F 11/3652 |
| 2021/0065708 | A1* | 3/2021 | Nishikawa | G10L 15/22 |
| 2021/0225370 | A1* | 7/2021 | Saito | G10L 15/28 |
| 2021/0357496 | A1* | 11/2021 | Lewis | G06F 9/445 |
| 2022/0006661 | A1* | 1/2022 | Rathod | H04L 12/1818 |

OTHER PUBLICATIONS

International Search Report dated Jul. 9, 2019 in PCT/JP2019/017734 filed on Apr. 25, 2019, 1 page.

* cited by examiner

*Fig.3*

CATEGORY DB

| WORD | CATEGORY |
|---|---|
| RAMEN | COOKING/FOOD |
| RAMEN | HOBBY/PREFERENCE |
| STOMACH | COOKING/FOOD |
| STOMACH | BODY CONDITION |

Fig. 4

USER PROFILE DB

| USER ID | FOCUS INFORMATION | FEATURE VECTOR | PREDICATE ARGUMENT STRUCTURE PAIR | TagA | TagB | REGISTRATION DATE |
|---|---|---|---|---|---|---|
| 001 | RAMEN | v1 | RAMEN_LIKE | COOKING/FOOD | HOBBY/PREFERENCE | 2018/4/17 |
| 001 | RICE BALL | v2 | RICE BALL_EAT | COOKING/FOOD | HOBBY/PREFERENCE | 2018/4/20 |
| 001 | MOVIE | v3 | MOVIE_WATCH | HOBBY/PREFERENCE | | 2018/4/5 |
| ... | ... | | | | | |
| 002 | | | | | | |

Fig.5

SPEECH DB (a)

| FOCUS INFORMATION | SPEECH SENTENCE |
|---|---|
| STOMACH | WHAT ABOUT SNACKS? |

DB FOR CONNECTING SECOND SPEECH SENTENCE (b)

| I HEARD |
|---|
| AND |

DB FOR EXPRESSING DATE AND TIME (c)

| 25 DAYS < CURRENT DATE AND TIME − REGISTRATION DATE < 35 DAYS | ONE MONTH AGO |
|---|---|
| 9 DAYS < CURRENT DATE AND TIME − REGISTRATION DATE < 24 DAYS | TWO TO THREE WEEKS AGO |
| 6 DAYS < CURRENT DATE AND TIME − REGISTRATION DATE < 8 DAYS | ONE WEEK AGO |
| ... | |

*Fig.8*

S101 — INPUT INFORMATION: MY STOMACH IS HUNGRY

S101 — RESULT OF ANALYSIS OF INPUT INFORMATION: MY/STOMACH/IS/HUNGRY

S101 — FOCUS INFORMATION: STOMACH

S102 — CALCULATE FEATURE VECTOR v1

S103 — DETERMINE CATEGORY AND DETERMINE PRIORITY CRITERIA

S105 — ACQUIRE USER PROFILE
ACQUIRE ONE OR A PLURALITY OF USER PROFILES
ON THE BASIS OF FEATURE VECTOR
HERE, ACQUIRE USER PROFILE IN RELATION TO
FOCUS INFORMATION: RAMEN
AND FOCUS INFORMATION: RICE BALL

S106 —
SELECT USER PROFILE OF WHICH DATE AND TIME INFORMATION
IS OLD ON THE BASIS OF PRIORITY CRITERION
HERE ACQUIRE FOCUS INFORMATION: RAMEN AND
PREDICATE ARGUMENT STRUCTURE PAIR: RAMEN_LIKE

S107 —
GENERATE SECOND SPEECH SENTENCE
SECOND SPEECH SENTENCE: YOU LIKE RAMEN

S107 —
GENERATE FIRST SPEECH SENTENCE
FIRST SPEECH SENTENCE: WHAT ABOUT SNACKS?

S107 —
GENERATE SPEECH SENTENCE
(DATE AND TIME SENTENCE + SECOND SPEECH SENTENCE
+ CONNECTION SENTENCE + FIRST SPEECH SENTENCE)
ABOUT ONE MONTH AGO, I HEARD THAT YOU LIKE RAMEN,
WHAT ABOUT SNACKS?

S108 —
OUTPUT SPEECH SENTENCE

INTERACTIVE DEVICE

TECHNICAL FIELD

The present invention relates to a dialogue device that has a dialogue with a user.

BACKGROUND ART

There is a description relating to a conversation processing device in Patent Literature 1 (Japanese Unexamined Patent Publication No. 2001-188787). This conversation processing device stores profile data relating to a user's preferences and can have a conversation with a user using this profile data.

CITATION LIST

Patent Literature

[Patent Literature 1] Japanese Unexamined Patent Publication No. 2006-292980

SUMMARY OF INVENTION

Technical Problem

However, in the invention disclosed in Patent Literature 1 described above, in a case in which there are a plurality of pieces of profile data, profile data to be employed for having a conversation is not determined, and an appropriate response cannot be performed. For example, when only a profile that has been previously acquired is used, an appropriate response cannot be performed, and thus a decrease in the degree of intimacy with a user may be caused.

Thus, in order to solve the problems described above, an object of the present invention is to provide a dialogue device enabling speech capable of improving a degree of intimacy with a user or a degree of user satisfaction.

Solution to Problem

The present invention includes: an input information acquiring unit configured to acquire input information from a user; a focus information acquiring unit configured to acquire focus information representing a focus in the input information; a user profile storing unit configured to store profile information of the user and date and time information on a date and time at which the profile information is registered in association with each other; a profile information acquiring unit configured to acquire the profile information in accordance with a priority level determined on the basis of the date and time information from the profile information corresponding to the focus information stored in the user profile storing unit; and a speech generating unit configured to generate speech information corresponding to the profile information.

According to this configuration, speech information can be generated using profile information according to date and time information. Therefore, a degree of intimacy with a user or a degree of user satisfaction can be improved.

Advantageous Effects of Invention

According to the present invention, a degree of intimacy with a user or a degree of user satisfaction can be improved.

BRIEF DESCRIPTION OF DRAWINGS

FIG. 3 is a diagram illustrating a specific example of a category table.

FIG. 4 is a diagram illustrating a specific example of a user profile DB 110.

FIG. 5 is a diagram illustrating a specific example of speech DB 111.

FIG. 8 is a schematic diagram of a process of generating a message M2 from a message M1.

DESCRIPTION OF EMBODIMENTS

Hereinafter, an embodiment of the present invention will be described with reference to the attached drawings. If possible, the same reference signs will be assigned to parts that are the same, and duplicate description thereof will be omitted.

Figure 1:
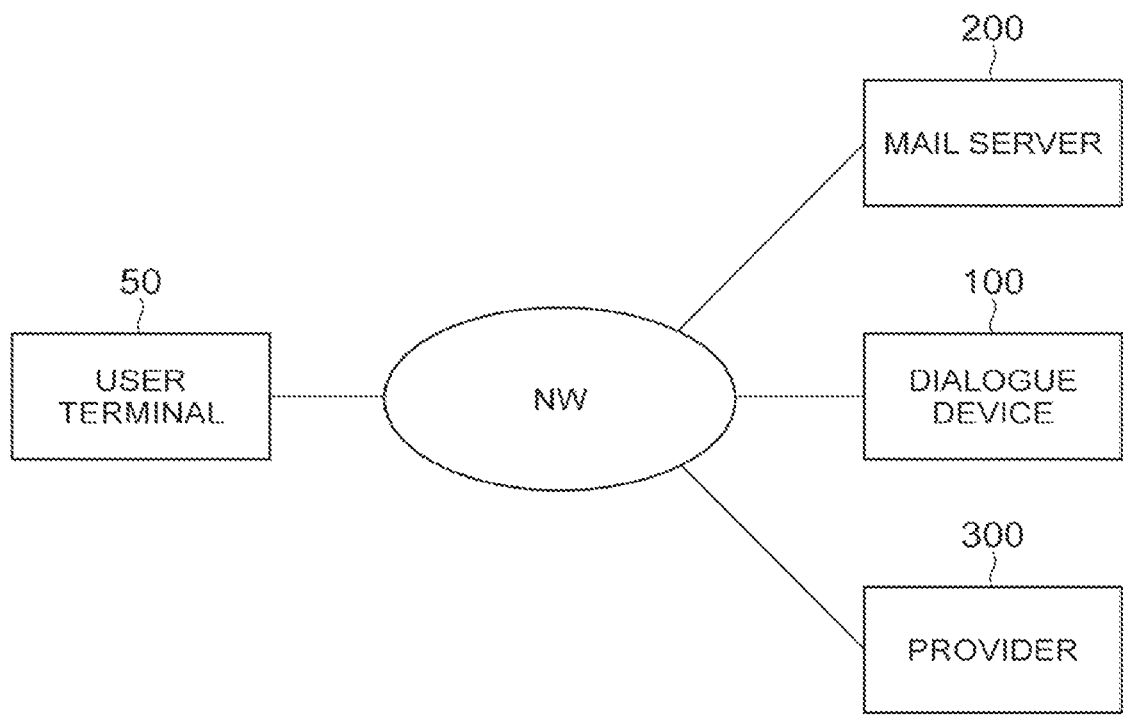
FIG. 1 is a system configuration diagram of a dialogue system including a dialogue device 100 according to this embodiment.

FIG. 1 is a system configuration diagram of a dialogue system including a dialogue device 100 according to this embodiment. As illustrated in FIG. 1, this dialogue system is configured to include a dialogue device 100, a mail server 200, and a provider 300. The dialogue device 100 performs a dialogue process for a user terminal 50. For example, the dialogue device 100 generates dialogue information corresponding to input information (text information) transmitted from the user terminal 50 and replies to the user terminal 50. The dialogue information is sentence information based on a topic (focus information) of the input information and/or a user profile (profile information) of a user using the user terminal 50. In accordance with this system, the user using the user terminal 50 can have a dialogue with the dialogue device 100. For example, a conversation not requiring provision of information of a content such as a chat can be performed. It should be noted that the user terminal 50 is an information processing device such as a mobile terminal, a smartphone, a tablet terminal, or the like operated by the user. The user inputs a text for a dialogue as input information by operating the user terminal 50.

The dialogue device 100 extracts the user profile of the user on the basis of input information transmitted from the user terminal 50, stores the extracted user profile, and generates dialogue information using the user profile.

In addition, the user profile is generated on the basis of a dialogue between the dialogue device 100 and the user terminal 50 but is not limiting. The user profile may be generated by the mail server 200 or the provider 300 on the basis of information (mail text or the like) acquired through mail communication with the user terminal 50 or information (a search key or the like) acquired through an internet connection.

In such a case, the dialogue device 100 is configured to be able to communicate with the mail server 200 and the provider 300, acquires information of an individual user using a user ID as a key, and generates the user profile.

In addition, the dialogue device 100 is configured to be able to communicate with the user terminal 50 through a network, but is not limiting. The dialogue device 100 may be built in the user terminal 50, and the user may directly input input information and the like to the dialogue device 100.

Figure 2:
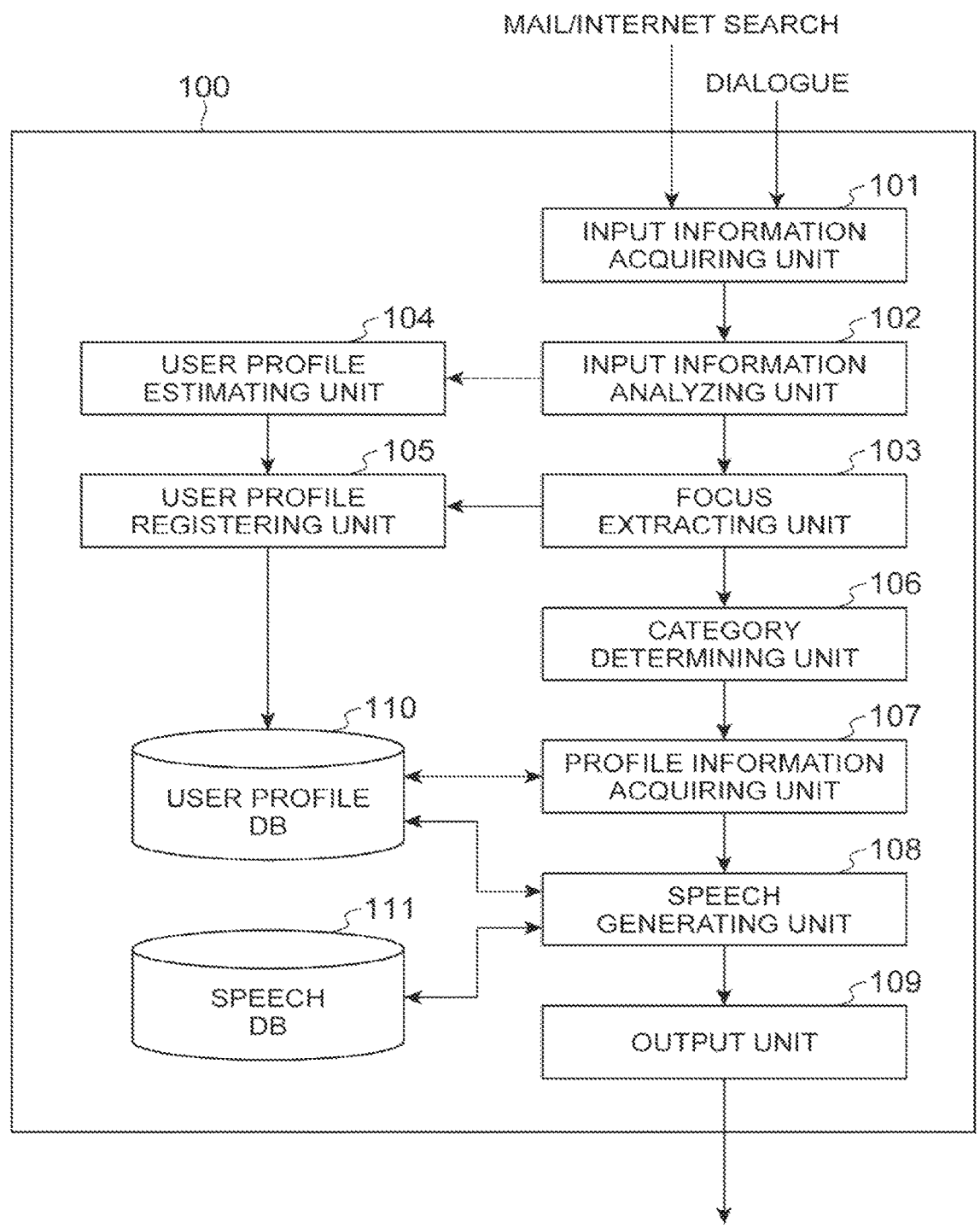
FIG. 2 is a block diagram illustrating the functional configuration of the dialogue device 100.

Next, a detailed functional configuration of this dialogue device 100 will be described. FIG. 2 is a block diagram illustrating the functional configuration of the dialogue device 100. As illustrated in FIG. 2, the dialogue device 100 is configured to include an input information acquiring unit 101, an input information analyzing unit 102, a focus extracting unit 103 (focus information acquiring unit), a user profile estimating unit 104, a user profile registering unit 105, a category determining unit 106, a profile information acquiring unit 107, a speech generating unit 108, an output unit 109, a user profile DB 110 (user profile storing unit), and a speech DB 111. Hereinafter, each constituent element will be described.

The input information acquiring unit 101 is a part that acquires input information transmitted from the user terminal 50 directly or through a network.

The input information analyzing unit 102 is a part that analyzes input information acquired by the input information acquiring unit 101. More specifically, the input information analyzing unit 102 extracts minimum units having meaning in a language such as one or a plurality of words, postpositional particles, verbs, and the like from the input information by performing a morphological analysis.

The focus extracting unit 103 is a part that extracts focus information indicating at least some topics of user speech (the input information) on the basis of information (information of minimum units) that is acquired through an analysis performed by the input information analyzing unit 102 and other information input by the user. The focus information, for example, is a word that becomes a most central topic in the input information input by the user. Various known technologies can be applied for extracting focus information from input information and, for example, a machine learning technique such as deep learning, SVM, or the like may be used.

As one example, the following known technology may be used. The focus extracting unit 103 extracts words extracted by the input information analyzing unit 102 (the morphological analysis) from input information as candidates for focus information and extracts words or characters positioned before and after each candidate for the focus information in the input information from the user and features (characteristics) thereof. The focus extracting unit 103 calculates scores on the basis of features of the candidates for focus information and the words (including characters) positioned before/after the candidates and determines focus information from among the candidates for the focus information on the basis of the scores.

In addition, the focus extracting unit 103 calculates a feature vector of the focus information. The feature vector of the focus information is a vector representing meanings of words represented by the focus information. For example, words can be represented as a vector using a known technology such as Word2Vector or the like.

The user profile estimating unit 104 is a part that estimates the user profile from input information transmitted by the user terminal 50. For example, from the input information, the user profile including focus information (a topic) of the input information, a feature vector, a predicate argument structure pair, TagA, TagB, and the like is estimated. The predicate argument structure pair is a pair of a predicate illustrated as a verb and items that become a subject and an object of the predicate. TagA and TagB are information representing categories in the predicate argument structure pair. The user profile can be estimated on the basis of words included in the input information.

As a simplest processing method, the following process may be considered. The user profile estimating unit 104 extracts focus information from input information input during a dialogue and extracts a predicate argument structure pair from the input information. For example, a predicate argument structure pair "ramen_like" can be extracted from input information "like ramen." The predicate argument structure is information that can be analyzed using a known technology.

In addition, there is a method in which a table in which an attribute, an hobby, a preference, or the like is associated with each word is prepared in advance, and the user profile estimating unit 104 estimates an attribute, a hobby, a preference, or the like corresponding to a word (for example, focus information) acquired by the input information analyzing unit 102 as the user profile by referring to the table described above.

A method of calculating focus information and a feature vector is the same as that of the process performed by the focus extracting unit 103.

In addition, as one example, the following process may be used as a known technology. In other words, the user profile estimating unit 104 may use an estimation process using dependency between attributes of each profile, which is a known technology. According to this known technology, for example, the user profile estimating unit 104 generates a word notation-feature representing a feature of a word notation on the basis of each word included in a document generated by the user, who is an estimation target, and estimates a plausible substantial predicate representing an attribute value of a profile attribute of the user, who is an estimation target, for an observed predicate representing the generated word denotation-feature on the basis of a learned estimation model, whereby an attribute value of the profile attribute of the user, who is an estimation target, can be estimated.

The user profile registering unit 105 is a part that stores information such as focus information, a feature vector, a predicate argument structure pair, TagA, and the like extracted by the user profile estimating unit 104 in the user profile DB 110 in association with a user ID as the user profile together with registration date and time.

The category determining unit 106 is a part that determines a category of the focus information extracted by the focus extracting unit 103. The category determining unit 106 includes a category table in which a word and a category are associated with each other in advance and determines a category corresponding to a word described in the focus information. For example, in a case in which "ramen" is extracted as focus information, the category of "ramen" is determined as being "cooking/food." In addition, Tag and a category in the user profile described above are the same information.

FIG. 3 is a diagram illustrating a specific example of the category table. As illustrated in FIG. 3, one or a plurality of categories are associated with one word.

The profile information acquiring unit 107 is a part that acquires a user profile corresponding to focus information determined by the category determining unit 106 from the user profile DB 110. In other words, the profile information acquiring unit 107 compares the feature vector of the focus information with a feature vector of focus information of each user profile and acquires a user profile for which an inter-vector distance is equal to or shorter than a predetermined distance.

In addition, the profile information acquiring unit 107 is not limited to acquiring a profile on the basis of a feature vector of the focus information. Corresponding profile information may be acquired using Tag information representing a category of the focus information.

In a case in which there are a plurality of profiles of which an inter-vector distance is equal to or shorter than the predetermined distance, the profile information acquiring unit 107 acquires one piece of profile information in accordance with a priority level based on a category determined by the category determining unit 106. For example, when it is determined by the category determining unit 106 that the extracted focus information belongs to a category relating to "hobby/preference," the profile information acquiring unit 107 acquires a user profile of which a registration date the oldest among user profiles stored in the user profile DB 110. It should be noted that a profile of which a registration date is the oldest being prioritized is an example and thus is not limiting. A profile of which a registration date is the newest in accordance with the category may be prioritized.

In addition, the profile information acquiring unit 107 may not acquire user profiles of which registration dates in the user profile DB 110 are before a predetermined date and time or user profiles of which registration dates are after a predetermined date and time. The reason for this is that user profiles that are too old or new do not contribute to the improvement of a degree of user satisfaction and friendliness.

In addition, the profile information acquiring unit 107 may determine the range of registration dates described above, which are acquisition targets, on the basis of a category determined by the category determining unit 106. Depending on a category, there are cases in which there is no effect on a degree of user satisfaction, friendliness, and the like even when an old user profile is used.

In addition, the profile information acquiring unit 107 may determine a user profile that is an acquisition target on the basis of a time frame, a time period, or a season represented by the registration date in the user profile DB 110. For example, by using a user profile of which a registration date is in the same time frame as the time frame of the acquisition date and time of input information, a degree of user satisfaction and friendless can be improved.

In addition, the profile information acquiring unit 107 may perform switching between acquisition/non-acquisition of a user profile according to the time frame, the time period, or the season on the basis of a category determined by the category determining unit 106. Depending on a category, there are cases in which a dialogue can be performed regardless of a time frame, a time period, and a season, and there is no effect on the degree of user satisfaction, friendliness, and the like.

The speech generating unit 108 is a part that acquires a first speech sentence corresponding to focus information of input information from the speech DB 111. In addition, in a case in which a user profile corresponding to focus information of input information is acquired by the profile information acquiring unit 107, the speech generating unit 108 generates a second speech sentence using the user profile and adds the generated second speech sentence to the first speech sentence, thereby generating a speech sentence.

For example, the speech generating unit 108 acquires a first speech sentence "What about snacks?" from the speech DB 111 on the basis of focus information "stomach" of input information "My stomach is hungry." In addition, the speech generating unit 108 acquires a predicate argument structure pair "ramen_like" from the user profile acquired using a feature vector of the focus information "stomach" from the user profile DB 110. The speech generating unit 108 generates a second speech sentence "You like ramen" from the predicate argument structure pair "ramen_like."

The speech generating unit 108 generates one speech sentence by combining the first speech sentence and the second speech sentence. For example, a speech sentence "I heard you like ramen. What about snacks?" is generated. It should be noted that "I heard" is a sentence that is held in a fixed form, and "I heard" is added to the beginning of the sentence in a case in which a second speech sentence based on the user profile is added.

Furthermore, the speech generating unit 108 may further add a term representing a date and time on the basis of the registration date of the user profile. For example, in a case in which the registration date of the user profile is one month ago, a speech sentence "one month ago" may be generated and added before the second speech sentence.

The output unit 109 is a part that outputs a speech sentence (speech information) generated by the speech generating unit 108 to the user terminal 50.

The user profile DB 110 is a database that stores a user profile in association with a user ID. FIG. 4 is a diagram illustrating a specific example of the user profile DB 110. As illustrated in FIG. 4, the user profile DB 110 describes a user profile including focus information, a feature vector of the focus information, a predicate argument structure pair, TagA, TagB, and a registration date in association with a user ID. The user ID is an ID used for identifying a user using the user terminal 50. The user ID may be either an ID used for identifying a user terminal or a user' ID.

The focus information is information estimated by the user profile estimating unit 104 and is information representing a topic in the input information.

A feature vector of focus information is information representing a word as a vector that is acquired by performing known language processing such as Word2Vector.

A predicate argument structure pair is information representing a predicate argument structure estimated by the user profile estimating unit 104. Generally, the predicate argument structure pair is formed by a subject or an object and a predicate. In the example illustrated in FIG. 4, the predicate argument structure pair is formed by an object and a predicate.

TagA and TagB are information representing an attribute, a hobby, a preference, and the like of a user. In the example illustrated in FIG. 4, TagA represents "cooking/food," and TagB represents "hobby/preference." The number of attributes of a user is not limited to one. Thus, in this embodiment, there are two attributes A and B. In addition, of course, the number of attributes is not limited to two and may be more than two.

A registration date is information representing date and time at which a user profile was registered.

Registration of a user profile will be described using specific input information. When "I/like/ramen" is input as a result of the analysis of the input information, the user profile estimating unit 104 estimates attributes (TagA and TagB) on the basis of the input. Here, Tags "cooking/food" and "hobby/preference" are estimated on the basis of "ramen" and "like." Then, the tags are registered in the user profile DB 110 together with the focus information extracted by the focus extracting unit 103 and the like.

There are cases in which a plurality of user profiles that are the same are registered in the user profile DB 110. In a case in which the same input information is input, the same user profile is registered. Accordingly, in a case in which there are a plurality of user profiles that are the same, the user profile DB 110 manages the number thereof, and the profile information acquiring unit 107 may determine a priority level for the acquisition of a user profile on the basis of the number.

The speech DB 111 is a database used for generating a speech sentence. This speech DB 111 includes a DB 111a for generation, a DB 111b for connecting a second speech sentence, and a DB 111c for expressing date and time. FIG. 5 is a diagram illustrating a specific example thereof. First, FIG. 5(a) is a diagram illustrating a specific example of the DB 111a for generation and illustrates a database in which focus information and a speech sentence are associated with each other. As illustrated in FIG. 5(a), focus information and a speech sentence are associated with each other. Although only one piece of focus information is illustrated in the drawing, generally, a plurality of speech sentences are associated with one pieces of focus information. The speech generating unit 108 can select a speech sentence according to a context randomly or on the basis of a dialogue history. It should be noted that the process of selecting a speech sentence according to a context on the basis of a dialogue history is performed using a known technology.

FIG. 5(b) is a diagram illustrating a specific example of the DB 111b for connecting a second speech sentence and stores connection sentences inserted when a first speech sentence and a second speech sentence are connected. In this embodiment, the DB 111b for connecting a second speech sentence is used for inserting a connection sentence "I heard" before the second speech sentence.

FIG. 5(c) is a diagram illustrating a specific example of the DB 111c for expressing date and time, and a difference between the current date and time and a registration date and an expression (time concept information) that is appropriate for a dialogue are associated with each other. In FIG. 5(c), in a case in which a difference between the current date and time and the registration date is larger than 25 days and smaller than 35 days, conversion into an expression "one month ago" is performed. FIG. 5(c) is an example and, of course, is not limiting. In addition, in a case in which information of the date and time is inserted into a speech sentence as time concept information, the DB 111c for expressing date and time becomes unnecessary.

The process of registering a user profile using the user profile estimating unit 104 and the user profile registering unit 105 described above is performed independently from or in parallel with the dialogue process using the focus extracting unit 103, the category determining unit 106, the profile information acquiring unit 107, and the speech generating unit 108. For example, in a case in which a mail activity, internet browsing, or the like is performed, the profile estimating process and the registration process are performed regardless of the dialogue process.

Figure 6:
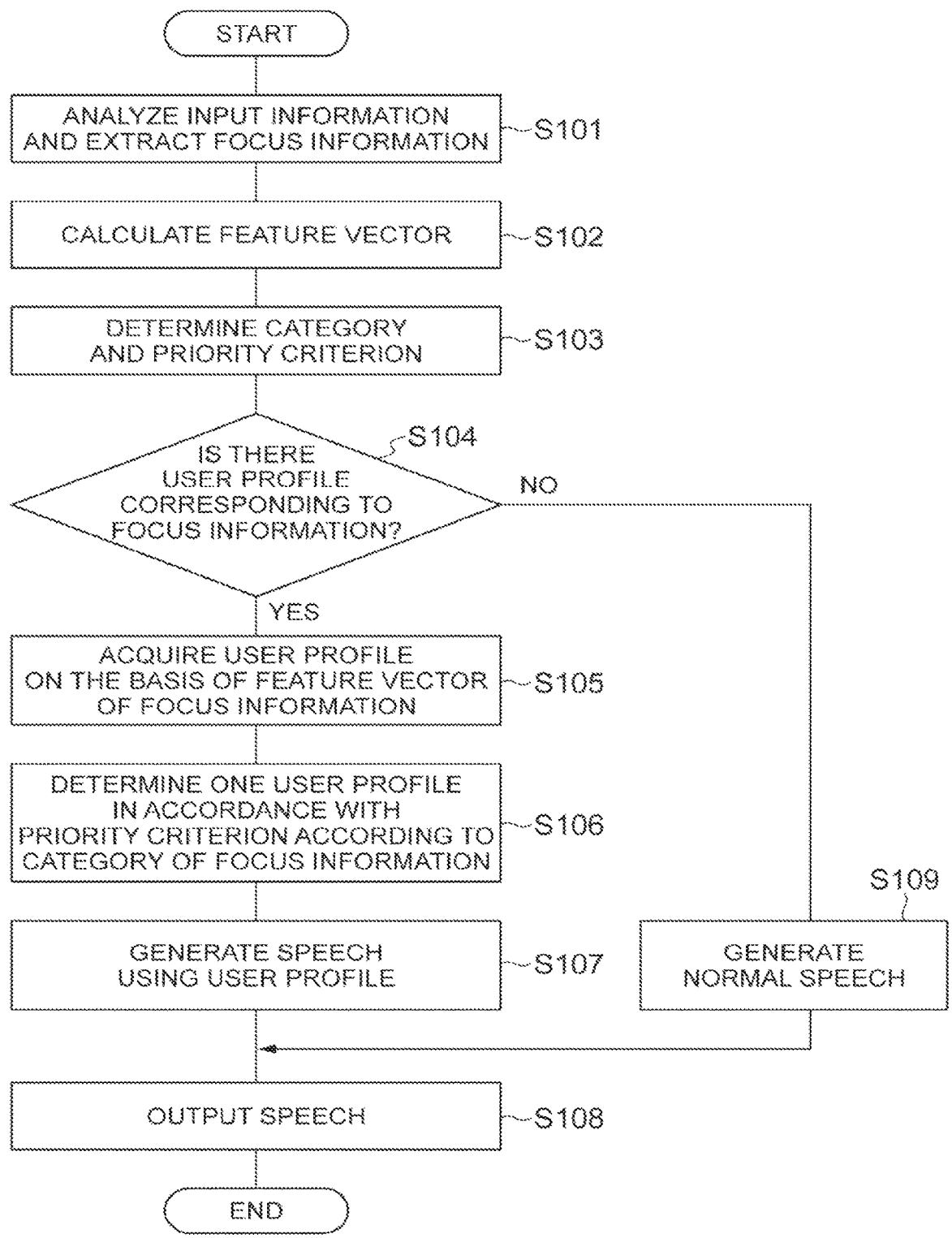
FIG. 6 is a flowchart illustrating an operation of the dialogue device 100.

An operation of the dialogue device 100 configured in this way will be described. FIG. 6 is a flowchart illustrating the operation of the dialogue device 100.

The input information acquiring unit 101 acquires input information from the user terminal 50, and the input information analyzing unit 102 analyzes the input information. The focus extracting unit 103 extracts focus information from the analyzed input information (S101). The focus extracting unit 103 calculates a feature vector of the focus information (S102). The category determining unit 106 determines a category and a priority criterion of the focus information (S103).

The profile information acquiring unit 107 determines whether or not there is a user profile corresponding to the focus information (S104). For example, the profile information acquiring unit 107 determines presence/absence of a user profile in the user profile DB 110 on the basis of the feature vector of the focus information.

In a case in which it is determined that there is a user profile corresponding to the focus information, the profile information acquiring unit 107 acquires one or a plurality of user profiles on the basis of the feature vector of the focus information by referring to the user profile DB 110 (S105).

The profile information acquiring unit 107 determines one user profile using a priority criterion set in accordance with a category of the focus information (S106). In addition, since the determination of a category is not essential, in a case in which the determination of a category is not performed, it is assumed that a priority criterion determined in advance is used. For example, a profile of which a registration date is the oldest is used with priority.

The speech generating unit 108 generates a speech sentence from a first speech sentence corresponding to the focus information of the input information and a second speech sentence based on one user profile (S107).

The output unit 109 outputs the generated speech sentence to the user terminal 50 (S108).

On the other hand, in a case in which a user profile corresponding to the focus information is not stored in the user profile DB 110 in S102, the speech generating unit 108 generates a first speech sentence corresponding to the focus information of the input information as a speech sentence (S109). The output unit 109 outputs the generated speech sentence to the user terminal 50 (S108).

A speech sentence according to the user profile can be generated through the process described above.

Figure 7:
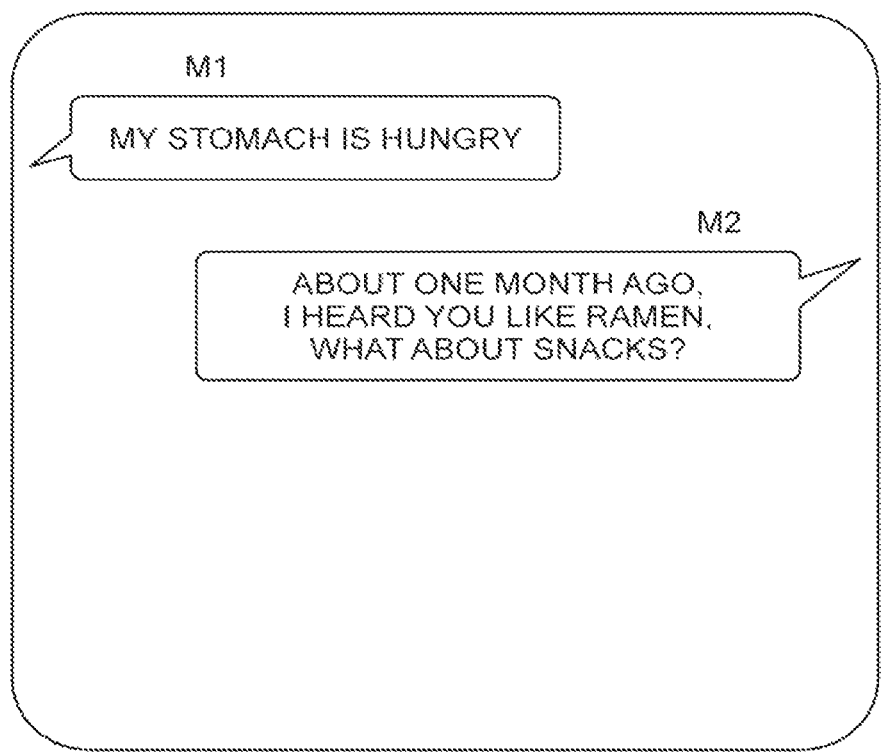
FIG. 7 is a diagram illustrating an example of a display screen of a user terminal 50 having a dialogue with the dialogue device 100 according to this embodiment.

Next, a specific example of the dialogue will be described. FIG. 7 is a diagram illustrating an example of a display screen of the user terminal 50 having a dialogue with the dialogue device 100 according to this embodiment. As illustrated in FIG. 7, a user using the user terminal 50 inputs a message M1 "My stomach is hungry." For that, the dialogue device 100 generates a message M2 "About one month ago, I heard you like ramen, what about snacks?" and transmits the generated message to the user terminal 50. The user terminal 50 displays the message M2.

The dialogue device 100 stores a user profile "like ramen." and enables a dialogue using the user profile.

A process of generating a message M2 from this message M1 will be described with reference to a schematic diagram FIG. 8 is a schematic diagram illustrating the process.

As illustrated in FIG. 8, the input information acquiring unit 101 acquires the message M1 "My stomach is hungry." Thereafter, the input information analyzing unit 102 performs a morphological analysis and acquires a result of the analysis of the input information "My/stomach/is/hungry." The focus extracting unit 103 extracts focus information "stomach" (see S101 illustrated in FIG. 6).

Then, the focus extracting unit 103 calculates a feature vector v0 of the focus information "stomach" (see S102 illustrated in FIG. 6).

The category determining unit 106 determines a category corresponding to the focus information "stomach" and determines a priority criterion used for selecting a user profile (see S103 illustrated in FIG. 6).

When a user profile is acquired from the user profile DB 110, the profile information acquiring unit 107 determines whether or not there is a user profile having a feature vector v present within a predetermined distance from a feature vector v0 of the focus information "stomach" (see S103 illustrated in FIG. 6).

Then, the profile information acquiring unit 107 acquires one or a plurality of user profiles based on the feature vector v. Here, one user profile according to a priority criterion corresponding to the category determined by the category determining unit 106 is acquired. For example, in a case in which it is determined that the category relates to hobby/preference, a user profile of which the registration date is the oldest is acquired. Here, a user profile in which focus information "ramen" and a predicate argument structure pair "ramen_like" are present is acquired (see S106 illustrated in FIG. 6).

In the description with reference to FIG. 4, it is assumed that there are feature vectors v1 (focus information: ramen) and v2 (focus information: rice ball) as feature vectors within a predetermined distance from the feature vector v0.

The profile information acquiring unit 107 determines one user profile out of two user profiles in accordance with a priority criterion (whether a new registration date is prioritized, or an old registration date is prioritized) set in accordance with the category determined by the category determining unit 106. Here, the user profile including "focus information: ramen" is determined. It should be noted that although one user profile is determined here, two user profiles may be determined.

The speech generating unit 108 generates a second speech sentence based on the acquired user profile. Here, a second speech sentence "You like ramen" is generated using the predicate argument structure pair "ramen_like" in the user profile (see S107 illustrated in FIG. 6).

The speech generating unit 108 generates a first speech sentence on the basis of the focus information "stomach." Here, a speech sentence "What about snacks?" corresponding to the focus information "stomach" is acquired from the DB 111a for generation (see S107 illustrated in FIG. 6).

Then, the speech generating unit 108 generates a speech sentence by combining the first speech sentence and the second speech sentence. At the time of performing combination, the speech generating unit 108 adds a connection sentence "I heard" to form a natural sentence. The speech generating unit 108 generates "I heard you like ramen, what about snacks?" It should be noted that the generation order of the first speech sentence and the second speech sentence is not limited to that described above.

In addition, the speech generating unit 108 adds information relating to a date and time on the basis of the current date and time and the registration date and time of the user profile. Here, the speech generating unit 108 generates "One month ago, I heard that you like ramen, what about snacks?" by adding a date and time expression sentence "one month ago" to the speech sentence on the basis of the registration date and time (see S107 illustrated in FIG. 6).

In the example described above, although the profile information acquiring unit 107 has been described to acquire one user profile as an example, acquisition is not limiting. The profile information acquiring unit 107 may acquire a plurality of user profiles. In the case, it may be considered that the profile information acquiring unit 107 performs acquisition of a user profile having a feature vector present within a predetermined distance range, acquisition of a user profile selected in order from a high rank on the basis of the feature vector, or the like.

The speech generating unit 108 generates a plurality of speech sentences from a plurality of user profiles (in other words, predicate argument structure pairs) and appropriately combine the speech sentences.

In addition, in the description presented above, a second speech sentence is generated using a predicate argument structure pair in the user profile. However, the generation is not limited to a predicate argument structure pair, and one or a plurality of profiles may be selected on the basis of another element included in the user profile, for example, an attribute represented by TagA or TagB. In such a case, the speech generating unit 108 describes a speech sentence corresponding to the attribute represented by TagA or TagB in the DB 111a for generation and generates a speech sentence (second speech sentence) on the basis of the described speech sentence.

Next, operation effects of the dialogue device 100 according to this embodiment will be described. The dialogue device 100 according to this embodiment includes an input information acquiring unit 101 that acquires input information from a user, a focus extracting unit 103 that acquires focus information representing a focus in the input information, a user profile DB 110 that stores profile information of users and date and time information on a date and time at which the profile information was registered in association with each other, a profile information acquiring unit 107 that, in a case in which a plurality of user profiles corresponding to the focus information are acquired from the user profile DB 110, acquires profile information in accordance with a priority level set on the basis of the date and time information from the plurality of user profiles, and a speech generating unit 108 that generates a speech sentence (speech information) corresponding to the user profile.

According to this configuration, a speech sentence according to the user profile can be generated, and the degree of user satisfaction and friendliness can be improved. In addition, in this embodiment, a user profile that is used for generation of a speech sentence is selected on the basis of the date and time information at which the user profile was registered. Accordingly, the degree of user satisfaction and friendliness can be improved more effectively.

For example, the profile information acquiring unit 107 acquires one or a plurality of user profiles by prioritizing a user profile of which the date and time information is the oldest. By sharing user profiles of which the date and time information is old, degree of satisfaction and friendliness can be improved. Accordingly, the effects described above can be acquired through a relatively simple process. In other words, since the process is simple, a technical effect of reducing the processing load of processing units such as a CPU and the like is also acquired.

Furthermore, the dialogue device 100 according to this embodiment further includes the category determining unit 106 that determines a category of the focus information in the input information. The profile information acquiring unit 107 changes a priority level of the date and time information with which the user profile is acquired in accordance with the category and acquires a user profile in accordance with the priority level.

According to this configuration, the degree of user satisfaction and friendliness can be improved. For example, for hobbies and preferences, by prioritizing user profiles of which the date and time information is old, the degree of satisfaction and friendliness of the user for the dialogue device 100 is considered to be able to be improved. On the other hand, for the other categories, by prioritizing user profiles of which the date and time information is new, it is considered that improvement of the degree of satisfaction and friendliness of the user can be expected.

In addition, in the dialogue device 100, the speech generating unit 108 generates speech information including time concept information (including a message such as "one month ago" or the like or the date and time) on the basis of date and time information at which the acquired user profile was registered. For example, the speech generating unit 108 may generate a message relating to date and time on the basis of a difference between the registration date and time and the current date and time. For example, information such as "one month age" or the like representing a time concept is added to the speech sentence. In addition, the date and time may be added to the speech sentence without generating any message.

According to this configuration, speech with a time clarified can be performed, and a user's feeling of sharing the past becomes strong. Accordingly, the degree of satisfaction and the friendliness of the user can be improved.

In addition, in the dialogue device 100, at the time of acquiring a user profile on the basis of the date and time information, the profile information acquiring unit 107 acquires one user profile on the basis of an upper limit value of a lower limit value of the date and time information set in advance.

According to this configuration, an extremely old user profile can be excluded. In addition, speech based on an extremely new user profile, for example, a user profile based on input information that is actually input becomes repetition of a dialogue for a user, and there may be no fun.

In addition, in the dialogue device 100, the profile information acquiring unit 107 uses information representing a time frame, a time period, or a season as date and time information and acquires profile information of which the time frame, the time period, or the season is the same as that of the date and time information.

According to this configuration, a more appropriate user profile can be acquired. For example, for a topic of night, there are cases in which a user profile registered at nigh is appropriate. In addition, there are cases in which a user profile corresponding to a season is suitable.

The block diagram used for description of the embodiment described above illustrates blocks in units of functions. Such functional blocks (component units) are realized by an arbitrary combination of hardware and/or software. In addition, a means for realizing each functional block is not particularly limited. In other words, each functional block may be realized by one device that is combined physically and/or logically or a plurality of devices by directly and/or indirectly (for example, using a wire and/or wirelessly) connecting two or more devices separated physically and/or logically.

Figure 9:
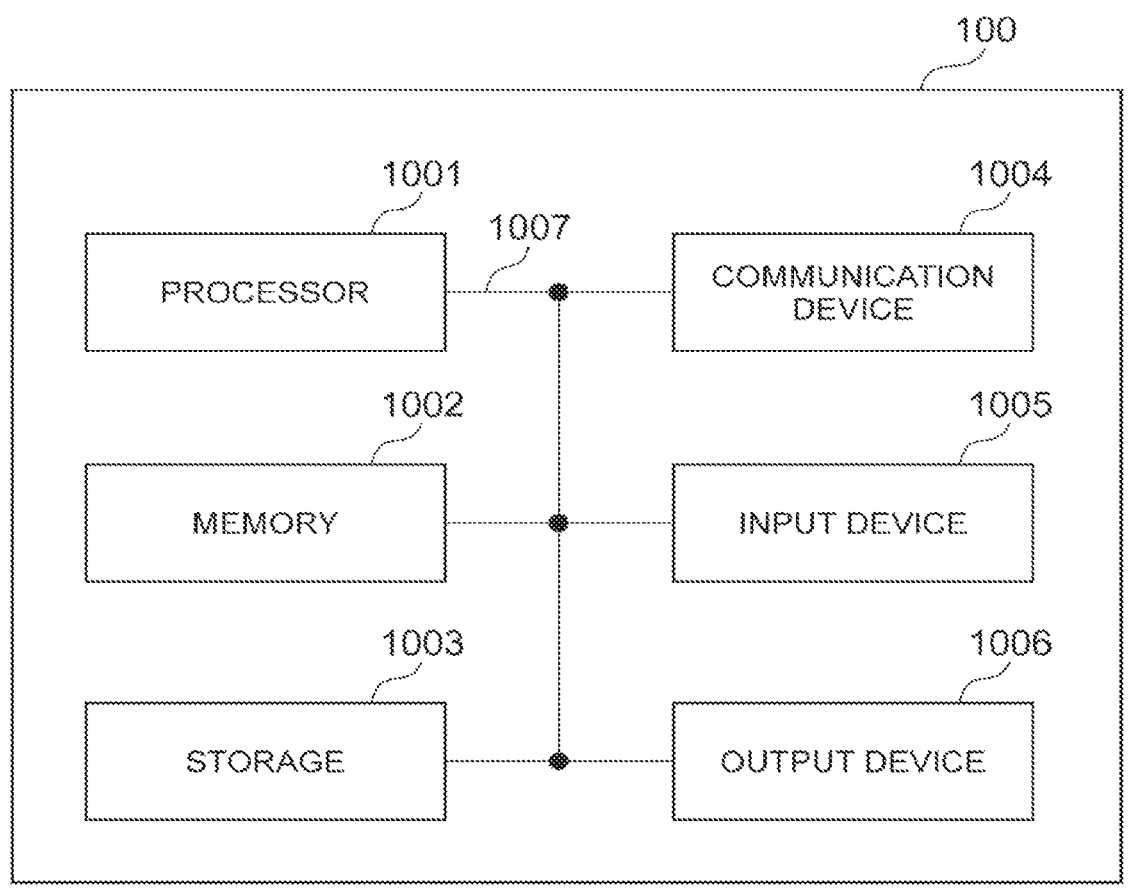
FIG. 9 is a diagram illustrating one example of the hardware configuration of the dialogue device 100 according to this embodiment.

For example, the dialogue device 100 according to one embodiment of the present invention and the like may function as a computer that performs the process of this embodiment. FIG. 9 is a diagram illustrating one example of the hardware configuration of the dialogue device 100 according to this embodiment. The dialogue device 100 described above, physically, may be configured as a computer device including a processor 1001, a memory 1002, a storage 1003, a communication device 1004, an input device 1005, an output device 1006, a bus 1007, and the like.

In addition, in the following description, a term "device" may be rephrased with a circuit, a device, a unit, or the like. The hardware configuration of the dialogue device 100 may be configured to include one or a plurality of devices illustrated in the drawing and may be configured without including some devices.

Each function of the dialogue device 100 is realized as the processor 1001 performs an arithmetic operation by causing predetermined software (a program) to be read onto hardware such as the processor 1001, the memory 1002, and the like and controls communication using the communication device 1004 and data reading and/or data writing using the memory 1002 and the storage 1003.

The processor 1001, for example, controls the entire computer by operating an operating system. The processor 1001 may be configured by a central processing unit (CPU) including an interface with peripheral devices, a control device, an arithmetic operation device, a register, and the like. For example, the input information analyzing unit 102, the focus extracting unit 103, the category determining unit 106, the profile information acquiring unit 107, and the like may be realized by the processor 1001.

In addition, the processor 1001 reads a program (a program code), a software module, or data from the storage 1003 and/or the communication device 1004 into the memory 1002 and executes various processes in accordance with these. As the program, a program causing a computer to execute at least some of the operations described in the embodiment described above is used. For example, the focus extracting unit 103 of the dialogue device 100 and the like may be realized by a control program that is stored in the memory 1002 and is operated by the processor 1001, and the other functional blocks may be similarly realized. Although the various processes described above have been described to be executed by one processor 1001, the processes may be executed simultaneously or sequentially by two or more processors 1001. The processor 1001 may be mounted using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like that are executable for performing a radio communication method according to one embodiment of the present invention.

The storage 1003 is a computer-readable recording medium and, for example, may be configured by at least one of an optical disc such as a compact disc ROM (CD-ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above, for example, may be a database including the memory 1002 and/or a storage 1003, a server, or any other appropriate medium.

The user profile DB 110 and the speech DB 111 described above may be realized by the storage 1003.

The communication device 1004 is hardware (a transmission/reception device) for performing inter-computer communication through a wired and/or wireless network and, for example, may be called also as a network device, a network controller, a network card, a communication module, or the like. For example, the input information acquiring unit 101, the output unit 109, and the like described above may be realized by the communication device 1004.

The input device 1005 is an input device (for example, a keyboard, a mouse, a microphone, a switch, buttons, a sensor, or the like) that accepts an input from the outside. The output device 1006 is an output device (for example, a display, a speaker, an LED lamp, or the like) that performs output to the outside. In addition, the input device 1005 and the output device 1006 may have an integrated configuration (for example, a touch panel).

In addition, devices such as the processor 1001, the memory 1002, and the like are connected using a bus 1007 for communication of information. The bus 1007 may be configured as a single bus or buses different between devices.

In addition, the dialogue device 100 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by the hardware. For example, the processor 1001 may be mounted using at least one of such hardware components.

As above, while this embodiment has been described in detail, it is apparent to a person skilled in the art that this embodiment is not limited to the embodiment described in this specification. This embodiment may be performed as a modified or changed form without departing from the concept and the scope of the present invention determined in accordance with the claims. Thus, the description presented in this specification is for the purpose of exemplary description and does not have any limited meaning for this embodiment.

Notification of information is not limited to an aspect/embodiment described in this specification and may be performed using a difference method. For example, the notification of information may be performed using physical layer signaling (for example, downlink control information (DCI), uplink control information (UCI), upper layer signaling (for example, radio resource control (RRC) signaling, medium access control (MAC) signaling, a master information block (MIB), a system information block (SIB)), any other signal, or a combination thereof. In addition, the RRC signaling may be referred to as an RRC message and, for example, may be an RRC connection setup message, an RRC connection reconfiguration message, or the like.

Each aspect/embodiment described in this specification may be applied to long term evolution (LTE), LTE-advanced (LTE-A), Super 3G, IMT-advanced, 4G, 5G, future ratio access (FRA), W-CDMA (registered trademark), GSM (registered trademark), CDMA 2000, ultra mobile broadband (UMB), IEEE 802.11 (Wi-Fi), IEEE 802.16 (WiMAX), IEEE 802.20, ultra-wideband (UWB), Bluetooth (registered trademark), a system using another appropriate system and/or a next generation system extended based on these.

The processing order, the sequence, the flowchart, and the like of each aspect/embodiment described in this specification may be changed in order as long as there is no contradiction. For example, in a method described in this specification, elements of various steps are presented in an exemplary order, and the method is not limited to the presented specific order.

Information and the like may be output from an upper layer (or a lower layer) to a lower layer (or an upper layer). In addition, the information and the like may be input and output through a plurality of network nodes.

The input/output information and the like may be stored in a specific place (for example, a memory) or managed using a management table. The input/output information and the like may be overwritten, updated, or additionally written. The output information and the like may be deleted. The input information and the like may be transmitted to another device.

A judgment may be performed using a value ("0" or "1") represented by one bit, may be performed using a Boolean value (true or false), or may be performed using a comparison between numerical values (for example, a comparison with a predetermined value).

The aspects/embodiments described in this specification may be individually used, used in combination, or be switched therebetween in accordance with execution. In addition, a notification of predetermined information (for example, a notification of being X) is not limited to be performed explicitly and may be performed implicitly (for example, a notification of the predetermined information is not performed).

It is apparent that software, regardless whether it is called software, firmware, middleware, a microcode, a hardware description language, or any other name, be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, and the like may be transmitted and received via a transmission medium. For example, in a case in which software is transmitted from a website, a server, or any other remote source using wiring technologies such as a coaxial cable, an optical fiber cable, a twisted pair, a digital subscriber line (DSL) and the like and/or radio technologies such infrared rays, radio waves, and microwaves, and the like, such wiring technologies and/or radio technologies are included in the definition of the transmission medium.

Information, a signal, and the like described in this specification may be represented using any one among other various technologies. For example, data, an instruction, a command, information, a signal, a bit, a symbol, a chip, and the like described over the entire description presented above may be represented using a voltage, a current, radio-waves, a magnetic field or magnetic particles, an optical field or photons, or an arbitrary combination thereof.

In addition, a term described in this specification and/or a term that is necessary for understanding this specification may be substituted with terms having the same meaning or a meaning similar thereto.

Terms "system" and "network" used in this specification are compatibly used.

In addition, information, a parameter, and the like described in this specification may be represented using absolute values, relative values from predetermined values, or other corresponding information. For example, radio resources may be directed using indices.

A user terminal may be called as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a hand set, a user agent, a mobile client, a client, or any other appropriate term by persons skilled in the art.

Terms such as "determining" used in this specification may include various operations of various types. The "determining," for example, may include a case in which judging, calculating, computing, processing, deriving, investigating, looking up (for example, looking up a table, a database, or any other data structure), or ascertaining is regarded as "determining." In addition, "determining" may include a case in which receiving (for example, receiving information), transmitting (for example, transmitting information), input, output, or accessing (for example, accessing data in a memory) is regarded as "determining." Furthermore, "determining" may include a case in which resolving, selecting, choosing, establishing, comparing, or the like is regarded as "determining" In other words, "determining" includes a case in which a certain operation is regarded as "determining."

Terms such as "connected" or "coupled" or all the modifications thereof mean all the kinds of direct or indirect connection or coupling between two or more elements and may include presence of one or more intermediate elements between two elements that are mutually "connected" or "coupled." Coupling or connection between elements may be physical coupling or connection, logical coupling or connection, or a combination thereof. When used in this specification, two elements may be considered as being mutually "connected" or "coupled" by using one or more wires, cables and/or print electric connections and, as several non-limiting and non-comprehensive examples, by using electromagnetic energy such as electromagnetic energy having wavelengths in a radio frequency region, a microwave region, and a light (both visible light and non-visible light) region.

Description of "on the basis of" used in this specification does not mean "only on the basis of" unless otherwise mentioned. In other words, description of "on the basis of" means both "only on the basis of" and "at least on the basis of."

In this specification, in a case in which names such as "first," "second," and the like is used, referring to each element does not generally limit the amount or the order of such an element. Such names may be used in this specification as a convenient way for distinguishing two or more elements from each other. Accordingly, referring to the first and second elements does not mean that only the two elements are employed therein or the first element precedes the second element in a certain form.

As long as "include," "including," and modifications thereof are used in this specification or the claims, such terms are intended to be inclusive like a term "comprising." In addition, a term "or" used in this specification or the claims is intended to be not an exclusive logical sum.

In this specification, other than a case in which clearly only one device is present in a context or technically, a device includes a plurality of devices.

REFERENCE SIGNS LIST

50 User terminal
100 Dialogue device
101 Input information acquiring unit
102 Input information analyzing unit
103 Focus extracting unit
104 User profile estimating unit
105 User profile registering unit
106 Category determining unit
107 Profile information acquiring unit
108 Speech generating unit
109 Output unit
200 Mail server
300 Provider

The invention claimed is:

1. A dialogue device comprising:
processing circuitry configured to
    acquire text information for a dialogue as input information from a user;
    acquire information indicating a topic in the dialogue as focus information representing a focus in the input information;
    store a plurality of profile information in which information indicating the user's preferences and date and time information for registering trend information are associated with each other, the profile information being obtained in past dialogues;
    acquire the profile information in accordance with a priority level determined on the basis of the date and time information from the plurality of profile information corresponding to the focus information; and
    generate speech information corresponding to the profile information,
wherein the processing circuitry
    obtains the profile information by prioritizing date and time information indicating a new date and time or obtains profile information by prioritizing date/time information indicating an old date/time,
    acquires the profile information of the new date and time information preferentially for one predetermined category, and
    acquires the profile information of the old date and time information preferentially for the other predetermined category.

2. The dialogue device according to claim 1, wherein the processing circuitry is configured to
    determine a category of the focus information in the input information, and
    change the priority level of the date and time information on the basis of which the profile information is acquired in accordance with the category and acquires the profile information in accordance with the priority level.

3. The dialogue device according to claim 2, wherein the processing circuitry generates speech information including time concept information based on the date and time information on the date and time at which the acquired profile information was registered.

4. The dialogue device according to claim 1, wherein the processing circuitry generates speech information including time concept information based on the date and time information on the date and time at which the acquired profile information was registered.

5. The dialogue device according to claim 1, wherein the processing circuitry acquires the profile information on the basis of an upper limit value or a lower limit value of the date and time information set in advance when the profile information is acquired on the basis of the date and time information.

6. The dialogue device according to claim 1, wherein the processing circuitry acquires the profile information of a time frame, a time period, or a season that is the same as the date and time at which the input information was acquired using information representing a time frame, a time period, or a season as the date and time information.

7. The dialogue device according to claim 1,
wherein the profile information includes focus information and a user's action tendency in the focus information as the tendency information.

8. The dialogue device according to claim 7,
wherein the user's action tendency is represented by predicate argument structures pair.

9. The dialogue device according to claim 1,
wherein the processing circuitry generates information including first speech information corresponding to the focus information and second speech information corresponding to the profile information.

10. A method, implemented by processing circuitry of a dialogue device, comprising:
  acquiring text information for a dialogue as input information from a user;
  acquiring information indicating a topic in the dialogue as focus information representing a focus in the input information;
  storing a plurality of profile information in which information indicating the user's preferences and date and time information for registering trend information are associated with each other, the profile information being obtained in past dialogues;
  acquiring the profile information in accordance with a priority level determined on the basis of the date and time information from the plurality of profile information corresponding to the focus information; and
  generating speech information corresponding to the profile information,
  wherein the method further includes
    obtaining the profile information by prioritizing date and time information indicating a new date and time or obtains profile information by prioritizing date/time information indicating an old date/time,
    acquiring the profile information of the new date and time information preferentially for one predetermined category, and
    acquiring the profile information of the old date and time information preferentially for the other predetermined category.

\* \* \* \* \*